United States Patent [19]

Folstad et al.

[11] Patent Number: 5,648,939

[45] Date of Patent: Jul. 15, 1997

[54] METHOD OF SEISMIC PROCESSING

[75] Inventors: Per Gunnar Folstad; Michael A. Schoenberg, both of Cambridge, England

[73] Assignee: Schlumberger Technology Corporation, Sugar Land, Tex.

[21] Appl. No.: 36,614

[22] Filed: Mar. 24, 1993

[30] Foreign Application Priority Data

Mar. 27, 1992 [GB] United Kingdom ............... 9206681

[51] Int. Cl.$^6$ .................................................. G01V 1/32
[52] U.S. Cl. ........................... 367/73; 367/25; 364/421; 364/422
[58] Field of Search ................ 367/251, 37; 382/49, 382/55; 364/421, 422

[56] References Cited

PUBLICATIONS

Schoenberg et al., "A calculus for finely layered anisotropic media" Geophysics (May 1989), pp. 581–589.

Hsu et al., "Seismic Velocities and Anisotropy from High--Resolution Sonic Logs", Seismograms in proceedings of 58th Annual Society of Exploration Geologists International Meeting (1988) Paper DEV 1.2, pp. 114–116.

Esmersoy, et al., "Quantitative Analysis of Fine Layering Effects: Medium Averaging versus Synthetic Seismograms" in proceedings of 59th Annual Society of Exploration Geologists International Meeting (Oct. 29–Nov. 2, 1989 in Dallas, Texas) Paper SM 3.4, pp. 1083–1085.

Schoenberg et al., "Group Theoretic Formulation for Elastic Properties of Media Composed of Anisotropic Layers" in Elastic Wave Propagation M.F. McCarthy, M.A. Hayes editors (1989: Elsevier Science) pp. 259–264.

Folstad et al., "Use of Equivalent Anisotropic Medium Theory to Calculate Synthetic AVO Response" in the proceedings of the Joint SEG/EAEG Summer Research Workshop (Aug. 9–14, 1992 in Big Sky, Montana) pp. 614–621.

Folstad et al., "Low Frequency Propagation through Fine Layering" presented at the proceedings of the 62nd Annual Society of Exploration Geologists International Meeting (1992).

Folstad et al., "Scattering from a Set of Anistropic Layers to Second Order in Frequency" in the proceedings of EAEG 55th Annual Meeting and Technical Exhibition (Jun. 7–11, 1993 in Stavanger, Norway) Paper P105.

Esmersoy et al, 59th Annu. Soc. Explor. Geoghy Int. Org., Oct. 29, 1989, vol. 2, pp. 1083–1085, Abst. Algorithm.

Bush, I., 53rd EAEG Mtg., May 26, 1991, pp. 1544–1555, Florence, italy; Abst. only herewith.

Hudson et al, Geoghysies, vol. 56, #4, 1991, pp. 572–576; abst. only herewith.

Chang, S. K., 62nd Annu. SEG Int. Mt, Oct. 25, 1992, pp. 1257–1259 (Pap. No. ST2I); abst. only.

Primary Examiner—Nelson Moskowitz
Attorney, Agent, or Firm—Peter Y. Lee; Wayne I. Kanak

[57] ABSTRACT

A seismic processing method relating finely sampled data of earth formations, such as that obtained from borehole measurements, to substantially longer wavelength seismic data, such as that obtained from surface seismic surveys or the like, while improving the ease of manipulation and processing speed of seismic processing. In a preferred embodiment, a fine layer model having n layers is defined, with the properties of each fine layer corresponding to the properties of each of n sampling points. An equivalent model is constructed by defining m equivalent layers, where m is substantially smaller than n and the thickness of the thickest of the equivalent layers is substantially smaller than a predetermined dominant wavelength of a seismic signal. Equivalent formation properties are generated for each equivalent layer by combining the sampled formation properties of the fine layers within the respective equivalent layer, preferably in accordance with the equivalent medium theory. A synthetic seismogram is derived from the equivalent model and the seismic signal.

19 Claims, 6 Drawing Sheets

Fig. 4

TRANSMISSION THROUGH EXACT AND 3m AVERAGED MODELS

METHOD OF SEISMIC PROCESSING

FIELD OF THE INVENTION

The present invention relates to a method of making a synthetic seismogram.

Background of the Invention

Such a method may be applied to sonic and density log data derived from bore hole log data. The synthetic seismogram obtained by this method may be used in searching for hydrocarbon deposits, for instance using the amplitude versus offset (AVO) technique, and may be compared with a seismogram derived from actual seismic data so as to allow a model of the geological structure to be refined.

It is known for the earth to be modelled by a few homogenous or smoothly varying layers separated by sharply defined interfaces. However, such a model does not agree well with bore hole log data, which often show considerable variation over very short intervals indicative of layering as fine as or finer than the log sampling. Ignoring the discontinuous behaviour in elastic parameters may result in over-simplified models.

Sonic and density logs give estimates of those rock properties needed to create a synthetic seismogram at a very fine scale as a function of depth, for instance with a sample for every 15 cm. of depth. The synthetic seismogram may then be compared with real seismograms produced from data taken at the surface of the earth. It is therefore possible to construct a better or more accurate representation of the subsurface as a model comprising a stack of very thin layers. In particular, a thin homogenous layer having properties in accord with the log data at each point of the sonic and density logs may be assigned to these points. However, for a depth range of 1,500 meters of formation with sampling at 15 cm. intervals, such a fine layer model constructed from sonic and density logs in this way would comprise 10,000 layers. As calculation of synthetic seismograms is approximately proportional to the number of layers, such calculations require large amounts of computer time.

BRIEF SUMMARY OF THE INVENTION

According to the invention, there is provided a method of making a synthetic seismogram from input data relating to properties of rock sampled at n vertically spaced sampling points, comprising: defining n substantially horizontally extending fine layers corresponding to the n sampling points, where the properties of the rock of each of the n fine layers are defined as the properties of the rock at the corresponding sampling point; defining a seismic signal having a predetermined dominant wavelength; constructing an equivalent model by defining m equivalent horizontally extending layers, where m is substantially smaller than n and the vertical thickness of the thickest of the equivalent layers is substantially smaller than the predetermined seismic wavelength, and averaging for each of the equivalent layers the properties of the rocks of the fine layers within the respective equivalent layer; and deriving from the equivalent model and the seismic signal a synthetic seismogram.

The input data may be derived from bore hole log data, for instance sonic and density log data. The sampling points may be regularly spaced, but need not be. The properties of rock may be elastic properties, for instance the coefficient of elasticity for pressure and shear waves. The properties may be isotropic or anisotropic, for instance transversely isotropic.

The predetermined seismic wavelength crossing an equivalent layer is preferably at least an order of magnitude greater than the thickness of the thickest equivalent layer. It has been found that, when the seismic wavelength is greater than or equal to about ten times the thickness of the largest equivalent layers, a synthetic seismogram can be produced which corresponds to the geology sufficiently closely for errors to be insignificant.

The seismic signal may be defined to be equivalent to an actual seismic signal and the thickness of the thickest equivalent layer may be chosen to be substantially less than the lowest significant wavelength. The synthetic seismogram may be compared directly with a seismogram obtained from actual data.

The synthetic seismogram may be derived using any suitable technique. For instance, the known techniques of the reflectivity method, finite difference methods or finite element method, may be used for this purpose.

The present method is based on Equivalent Medium Theory, in accordance with which any number of homogenous fine layers of a given total thickness may be replaced by an homogenous equivalent thick layer which behaves, under static loading of either applied stress or applied strain, in the same manner as the fine layers. Static response or time invariance can be extended to mean slow variation, where the load is equilibrated throughout the thick layer much more quickly, because of a very rapid time for signal propagation across the layer, than the characteristic time of the slow variation of the load. This is achieved by making the total thickness of the equivalent layers much smaller than the characteristic wavelength of the seismic signal. Thus, it is possible to replace the many fine layers with substantially fewer equivalent layers while providing a synthetic seismogram which is very close to that which would be obtained from the fine layers. It has been surprisingly found that this technique preserves not only travel times of seismic signals but also their amplitudes provided that the thickness of each equivalent layer is much shorter than the dominant seismic wavelength of the seismic signal.

Typically the dominant seismic wavelength is of the order of 50 meters so that, typically, 10 to 30 fine layers may be replaced by one equivalent layer. The equivalent model is thus much easier to understand and manipulate, for example in order to alter the model to enhance or suppress certain seismic signals. Further, as computation time is substantially proportional to the number of layers of the model, the equivalent model requires much less computation time in order to calculate synthetic seismograms, which represent the seismic response of the model to a hypothetical seismic source based on the equations of elastic wave propagation.

The present method may be used for various purposes, such as producing synthetic seismograms for amplitude versus offset (AVO) calibration of surface seismic data, where a full surface seismic shot record needs to be created, often several times after modification of the model.

BRIEF DESCRIPTION OF FIGURES

Other objects and features of the invention will become more readily apparent from a consideration of the following detailed description, taken in connection with the accompanying drawings.

DETAILED DESCRIPTION OF SPECIFIC EMBODIMENTS

An elastic model of the earth is created by assigning to each log point of sonic P/S wave velocity logs and density logs a thin homogenous isotropic layer whose thickness is the distance between successive log points. The density $\rho$ of each layer is specified by the density log, the P or compressional wave velocity $\alpha$ is specified by the output of the P wave log, and the S or shear wave velocity $\beta$ is specified by the output of the S wave log. Conventionally, these sonic logs measure wave velocity in the surrounding rock formation in a direction along a bore hole. However, sonic logs are becoming more sophisticated and it is becoming possible to measure differences in wave velocities in different directions at the same point (anisotropy). Even if the full possible anisotropic elastic behaviour is not accessible at each point from a suite of sonic logs, it is still possible to replace a set of anisotropic elastic layers with a single equivalent anisotropic layer. For conventional sonic logging, it is assumed that each of the fine layers is isotropic, in which case the anisotropic elastic behaviour of the equivalent layer is transversely isotropic, i.e. although wave velocity may vary with the direction of propagation of the wave, this variation is axially symmetric about an axis that is perpendicular to the layering.

In order to derive an equivalent model by replacing a plurality of fine layers by a single equivalent layer, medium averaging equations are derived from Equivalent Medium Theory for arbitrary anisotropic layers. Equivalent Medium Theory is known, for instance from: Backus, G. E., "Long-Wave Elastic Anisotropy Produced by Horizontal Layering", *J. of Geophysical Research*, Vol 67, No. 11, 4427–4440 (Oct. 1962); Helbig, K. and Schoenberg, M., "Anomalous Polarisation of Elastic Waves in Transversely Isotropic Media", *J. Accoust. Soc. Am.*, 81, 1235–1245; and from Schoenberg, M., and Muir, F., "A Calculus for Finely Layered Media", *Geophysics*, 54, 581–589 (May 1989). The derivation will be described hereinafter. However, the present invention is based on the application of this theory in a novel way, backed by experimental results, with the surprising result that both travel times and amplitudes of seismic signals are preserved, provided the thickness of each equivalent layer in the equivalent model is much shorter than the lowest or dominant seismic wavelength of the seismic signal.

The derivation of the medium averaging equations, and the equations themselves, are set out hereinafter.

Consider a stack of infinite layers made up of n perfectly homogenous layers, each layer having a relative thickness $h_i$, i=1, κ n so that $\Sigma_{i=1}$ to $_n h_i = 1$. Let the $x_3$ axis be perpendicular to the layering. For elastic waves with wavelengths much longer than the overall thickness of the layered stack, deformation due to the wave propagation through the stack is essentially static. In the long wavelength limit, the stack of layers is equivalent to a single homogenous layer of the same thickness as the stack of layers and of density $\rho$ equal to the thickness weighted average of the densities of the individual fine layers making up the stack, $\rho = \Sigma_{i=1}$ to $_n h_i \rho_i \equiv <\rho>$. The notation $<...>$ is used to denote a thickness weighted average.

The elastic moduli for the equivalent medium can be expressed in terms of thickness-weighted averages of various combinations of the moduli of each fine layer. In general, there are in any medium six independent stress components and, for an elastic medium undergoing very small strain as is the case for seismic waves, there are six corresponding strain components. A linear elastic medium is one in which the six stresses are a linear combination of the six strains, and this provides a very successful model to explain the small deformation occurring in the earth due to the propagation of seismic waves. EMT is based on the distribution of the stresses and strains that exist in the fine layers under static load, i.e. that a) stress $\sigma_{ij}$ acting 'across' the layers remains constant for all the layers, which can be shown to be true from equilibrium considerations, and b) that the layers are 'welded' together so that they all deform in their own plane the same amount implying that all strain $\epsilon_{ij}$ in the plane parallel to the layering remains constant for all the layers. With the $x_3$ axis taken to be perpendicular to the layering, this can be expressed as $$\sigma_{33i} = \sigma_{3i} = \sigma_3, \sigma_{23i} = \sigma_{4i} = \sigma_4, \sigma_{13i} = \sigma_{5i} = \sigma_5,$$

$$\epsilon_{11i} = \epsilon_{1i} = \epsilon_1, \epsilon_{22i} = \epsilon_{2i} = \epsilon_2, 2\epsilon_{12i} = \epsilon_{6i} = \epsilon_6. \quad (1)$$

where the notation used herein corresponds to that used by Schoenberg and Muir (referred to hereinbefore).

The other stress components, $\sigma_{11i} \equiv \sigma_{1i}, \sigma_{22i} \equiv \sigma_{2i}, \sigma_{12i} \equiv \sigma_{6i}$ and strain components $\epsilon_{33i} \equiv \epsilon_{3i}, 2\epsilon_{23i} \equiv \epsilon_{4i}, 2\epsilon_{13i} \equiv \epsilon_{5i}$ are not the same in all layers. From the definitions of stress and strain, in the static, long wavelength limit, these components can be replaced by their thickness-averaged values. The effective elastic moduli of the averaged medium may then be found through the following matrix formulation.

The stress-strain relation in any layer, say the ith one, may be written $$\sigma_{1i} = C_{11i}\epsilon_1 + C_{12i}\epsilon_2 + C_{16i}\epsilon_6 + C_{13i}\epsilon_{3i} + C_{14i}\epsilon_{4i} + C_{15i}\epsilon_{5i},$$

$$\sigma_{2i} = C_{12i}\epsilon_1 + C_{22i}\epsilon_2 + C_{26i}\epsilon_6 + C_{23i}\epsilon_{3i} + C_{24i}\epsilon_{4i} + C_{25i}\epsilon_{5i},$$

$$\sigma_{6i} = C_{16i}\epsilon_1 + C_{26i}\epsilon_2 + C_{66i}\epsilon_6 + C_{36i}\epsilon_{3i} + C_{46i}\epsilon_{4i} + C_{56i}\epsilon_{5i},$$

$\sigma_3 = C_{13}\epsilon_1 + C_{23}\epsilon_2 + C_{36}\epsilon_6 + C_{33}\epsilon_{3i} + C_{34}\epsilon_{4i} + C_{35}\epsilon_{5i}$ $\sigma_4 = C_{14}\epsilon_1 + C_{24}\epsilon_2 + C_{46}\epsilon_6 + C_{34}\epsilon_{3i} + C_{44}\epsilon_{4i} + C_{45}\epsilon_{5i}$ $\sigma_5 = C_{15}\epsilon_1 + C_{25}\epsilon_2 + C_{56}\epsilon_6 + C_{35}\epsilon_{3i} + C_{45}\epsilon_{4i} + C_{55}\epsilon_{5i}$ (2)

By defining the vectors $$S_{Ti} = \begin{pmatrix} \sigma_{1i} \\ \sigma_{2i} \\ \sigma_{6i} \end{pmatrix}, S_N = \begin{pmatrix} \sigma_3 \\ \sigma_4 \\ \sigma_5 \end{pmatrix}, E_T = \begin{pmatrix} \epsilon_1 \\ \epsilon_2 \\ \epsilon_6 \end{pmatrix}, E_{Ni} = \begin{pmatrix} \epsilon_{3i} \\ \epsilon_{4i} \\ \epsilon_{5i} \end{pmatrix}, \quad (3)$$

the stress-strain relations in any layer may be rewritten as $S_{Ti} = C_{TTi}E_T + C_{TNi}E_{Ni}$ $S_N = C_{NTi}E_6 + C_{NNi}E_{Ni}$ (4)

with $$C_{TTi} = \begin{pmatrix} C_{11i} & C_{12i} & C_{16i} \\ C_{12i} & C_{22i} & C_{26i} \\ C_{16i} & C_{26i} & C_{66i} \end{pmatrix}, C_{NNi} = \begin{pmatrix} C_{33i} & C_{34i} & C_{35i} \\ C_{34i} & C_{44i} & C_{45i} \\ C_{35i} & C_{45i} & C_{55i} \end{pmatrix},$$

$$C_{TNi} = \begin{pmatrix} C_{13i} & C_{14i} & C_{15i} \\ C_{23i} & C_{24i} & C_{25i} \\ C_{36i} & C_{46i} & C_{56i} \end{pmatrix}$$

and with $C_{NT}$ the transpose of matrix $C_{TN}$. Here, $C_{TTi}$ and $C_{NNi}$ are symmetric non-singular matrices.

Equations (4) are rewritten so as to isolate on the left hand side those stresses and strains that vary from layer to layer. To do this, premultiply the second equation of (4) by $C_{NNi}^{-1}$, solve for $E_{Ni}$ in terms of $S_N$ and $E_T$, and also substitute this expression for $E_{Ni}$ into the first equation of equation (4), yielding $$\begin{aligned} S_{Ti} &= C_{TTi}E_T + C_{TNi}[-C_{NNi}^{-1}C_{NTi}E_T + C_{NNi}^{-1}S_N] \\ &= [C_{TTi} - C_{TNi}C_{NNi}^{-1}C_{NTi}]E_T + C_{TNi}C_{NNi}^{-1}S_N, \\ E_{Ni} &= -C_{NNi}^{-1}C_{NTi}E_T + C_{NNi}^{-1}S_N. \end{aligned} \quad (5)$$

Then, take the thickness weighted average of both of these equations, yielding $\langle S_T \rangle = [\langle C_{TT} \rangle - \langle C_{TN}C_{NN}^{-1}C_{NT} \rangle]E_T + \langle C_{TN}C_{NN}^{-1} \rangle S_N$, $\langle E_N \rangle = -\langle C_{NN}^{-1}C_{NT} \rangle E_T + \langle C_{NN}^{-1} \rangle S_N$. (6)

The final step is to premultiply the second equation of (6) by $\langle C_{NN}^{-1} \rangle^{-1}$, solve for $S_N$, and also substitute this expression for $S_N$ into the first equation of (6), yielding $\langle S_T \rangle = C_{TT\,EMT}E_T + C_{TN\,EMT}\langle E_n \rangle$, $S_N = C_{NT\,EMT}E_T + C_{NN\,EMT}\langle E_N \rangle$. (7)

with $C_{NN\,EMT} = \langle C_{NN}^{-1} \rangle^{-1}$, $C_{TN\,EMT} = \langle C_{TN}C_{NN}^{-1} \rangle \langle C_{NN}^{-1} \rangle^{-1}$, $C_{TT\,EMT} = \langle C_{TT} \rangle - \langle C_{TN}C_{NN}^{-1}C_{NT} \rangle + \langle C_{TN}C_{NN}^{-1} \rangle \langle C_{NN}^{-1} \rangle^{-1} \langle C_{NN}^{-1}C_{NT} \rangle$ The elastic moduli for the equivalent medium are obtained immediately by comparing equations (7) with (4).

If the ith layer in the medium is isotropic, then $C_{TTi}$, $C_{NNi}$ and $C_{TNi}$ in (4) becomes $$C_{TTi} = \begin{pmatrix} \lambda_i + 2\mu_i & \lambda_i & 0 \\ \lambda_i & \lambda_i + 2\mu_i & 0 \\ 0 & 0 & \mu_i \end{pmatrix}, C_{NNi} = \begin{pmatrix} \lambda_i + 2\mu_i & 0 & 0 \\ \lambda_i & \mu_i & 0 \\ 0 & 0 & \mu_i \end{pmatrix}, \quad (8)$$

$$C_{TNi} = \begin{pmatrix} \gamma_i & 0 & 0 \\ \gamma_i & 0 & 0 \\ 0 & 0 & 0 \end{pmatrix}$$

If all layers are isotopic, then substitution of equations (8) into (7) and comparison with (4) give $C_{66\,EMT} = \langle \mu \rangle$, $C_{55\,EMT} = \langle \mu^{-1} \rangle^{-1}$, $C_{33\,EMT} = \langle \gamma \mu^{-1} \rangle^{-1}$, $C_{13\,EMT} = \langle 1 - 2\gamma \rangle C_{33}$, $C_{11\,EMT} = 4C_{66} - 4\langle \gamma \mu \rangle + C_{13}^2/C_{33}$, $C_{12\,EMT} = C_{11} - 2C_{66}$, (9)

all other $C_{ijEMT}$ being zero, thus defining a transversely isotropic (TI) medium. Here, shear modulus $\mu = \rho\beta^2$ and the square of the shear to compressional speed ratio $\gamma = \beta^2/\alpha^2 = \mu/(\lambda + 2\mu)$.

Thus, the Equivalent Medium Theory is used to average several thin layers into one thicker TI layer, where the thicknesses of the equivalent thicker layers at any depth are still much thinner than the smallest important seismic wavelength present in the layered medium at that depth. It has been found that initial log models with an original sampling interval of 15 cm. can be replaced by averaged TI models having layer thicknesses up to 2–5 meters, or of the order of ¹⁄₁₀ of the dominant seismic wavelength, without distorting the synthetic seismic response in any meaningful way. Frequency spectra for seismic sources normally are in the range 5–100 Hz, meaning that the shortest seismic wavelengths are of the order 15 to 50 meters, depending on the formation velocities.

Figure 1:
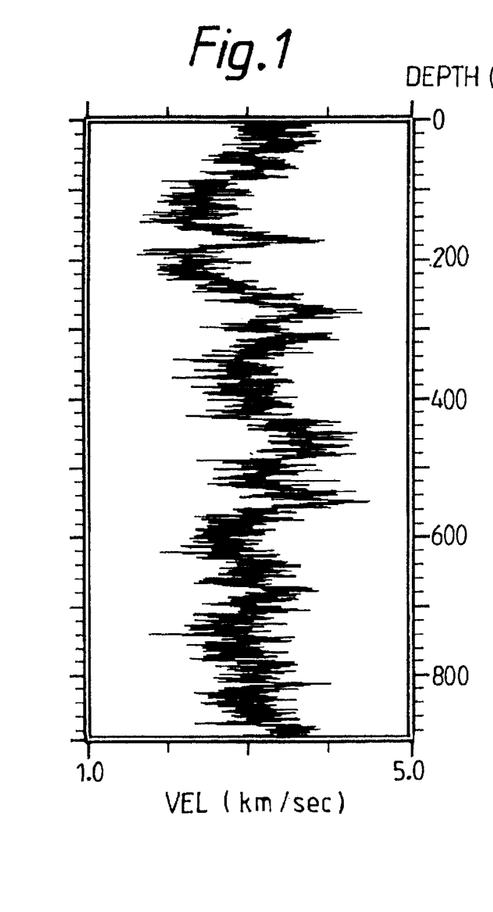
FIG. 1 shows synthetic sonic log data, specifically the P-wave velocity plotted over depth, in accordance with a free layer model of a 1000 meter section of the earth.

FIG. 1 shows the P-wave velocity of a synthetic fine layer model having 10,000 layers, each one being 10 cm thick. The formation layers of the earth are referred to as "horizontal" for convenience, although it is recognized that seismic features are not necessarily horizontal relative to the surface of the earth. Horizontal is taken to mean any convenient seismic orientation, as long as the "vertical" direction is taken to be perpendicular thereto.

Figure 2:
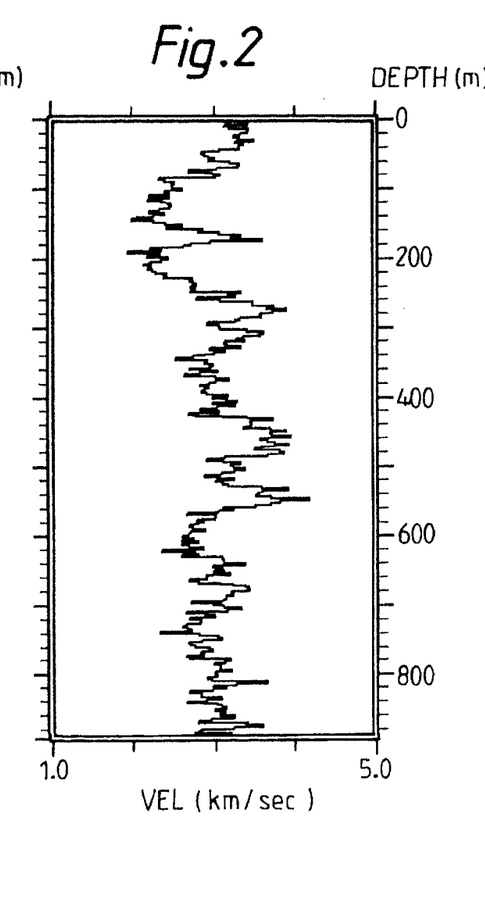
FIG. 2 shows averaged sonic log data from FIG. 1, in accordance with an ELM model of the invention having uniform layer thicknesses of 3 meters.
Figure 3:
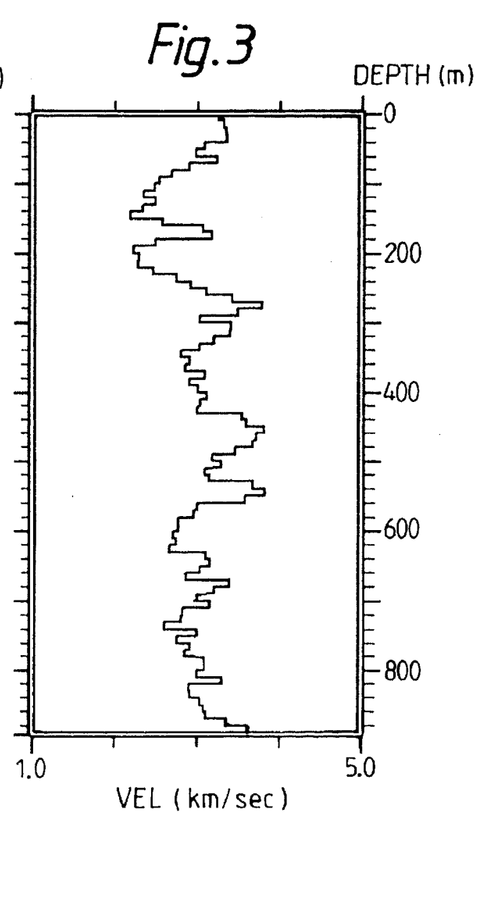
FIG. 3 shows averaged sonic log data from FIG. 1, in accordance with an ELM model having uniform layer thicknesses of 10 meters.

From the sampled P-wave, S-wave and density of the fine layer model of FIG. 1, an equivalent layered medium (ELM) model of 3 meter thick TI layers was created using equations (9), resulting in an averaged model of only 333 layers. The vertical P-wave velocity of this ELM model is shown in FIG. 2. For the sake of comparison, another ELM model using 10 meter thick layers is used, and the vertical P-wave velocity of this model is shown in FIG. 3.

The layer thickness in the ELM model need not be constant across an earth section of interest, and may vary depending on the particular acoustic and stratigraphic characteristics of a sub-part of the section, as well as the dominant or lowest significant seismic wavelength therein. However, for ease of description, the particular examples described herein have layers with uniform thicknesses.

Since conventional sonic logs only give velocities along the borehole axis, possible anisotropy at or below sonic scale has been necessarily neglected. However, this simplification is only due to the limitations in the conventional sonic log measurement technique, and is not a limitation in the use of the present techniques for modelling very fine anisotropic layers, or in its application to computing synthetic seismograms.

Figure 4:
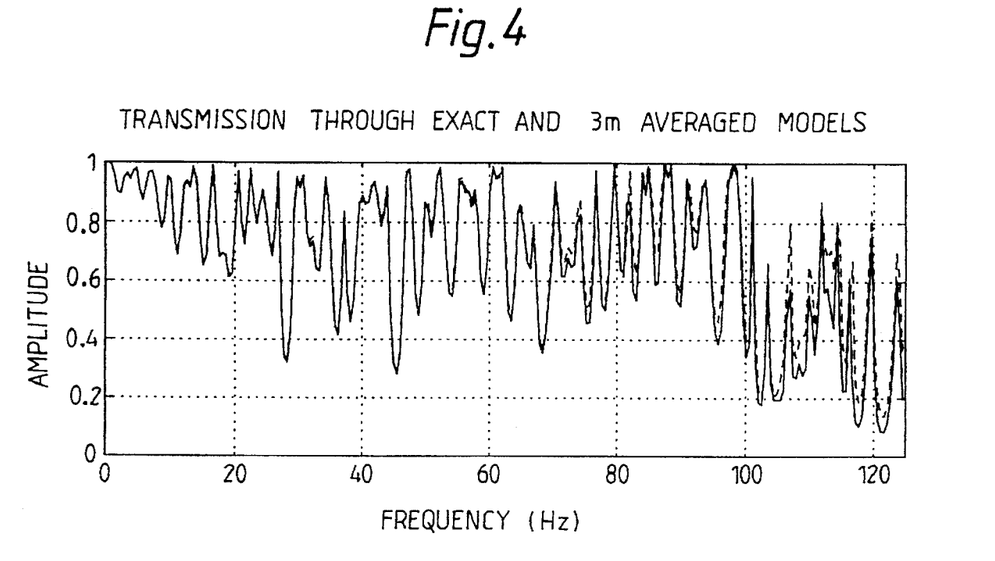
FIG. 4 shows the amplitude spectrum of a P-wave transmitted through the fine layer model (solid line) of FIG. 1, and through the 3 meter ELM model (dashed line) of FIG. 2.
Figure 5:
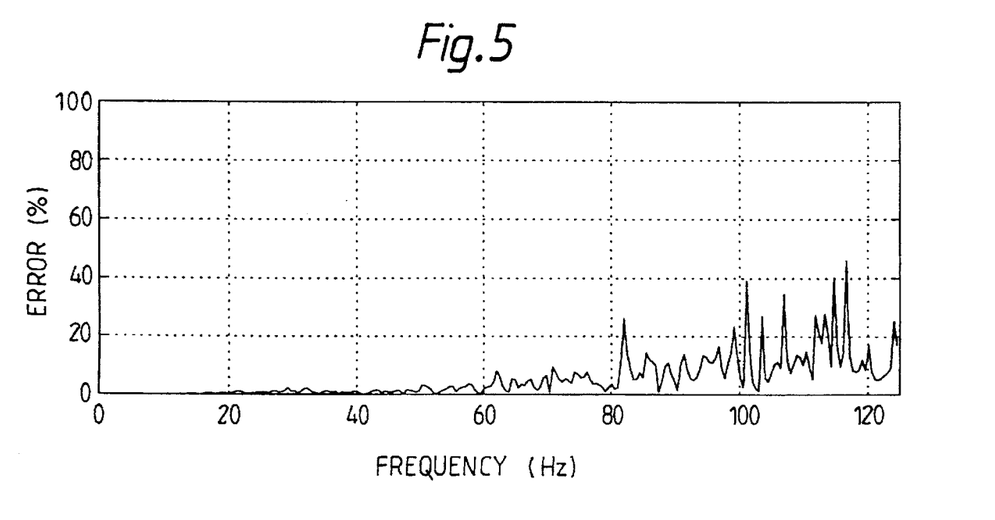
FIG. 5 shows the percent error between the two curves of FIG. 4, plotted against frequency.

FIG. 4 shows the amplitude spectrum of an impulsive plane P-wave transmitted vertically through the fine layer model (solid line), and through the 3 meter ELM model (dashed line) from the top to the bottom of the entire 1000 meter section. The percentage amplitude error between the two curves, representing the error of the ELM model, is shown in FIG. 5. For the seismic range of interest, approximately 0-80 Hz, it is clear that the error introduced from use of this ELM model is very small, and is insignificant. Although the error increases at higher frequencies, it will have no practical impact on the seismograms produced by the ELM model since there would be negligible seismic signals at those frequencies.

Figure 6:
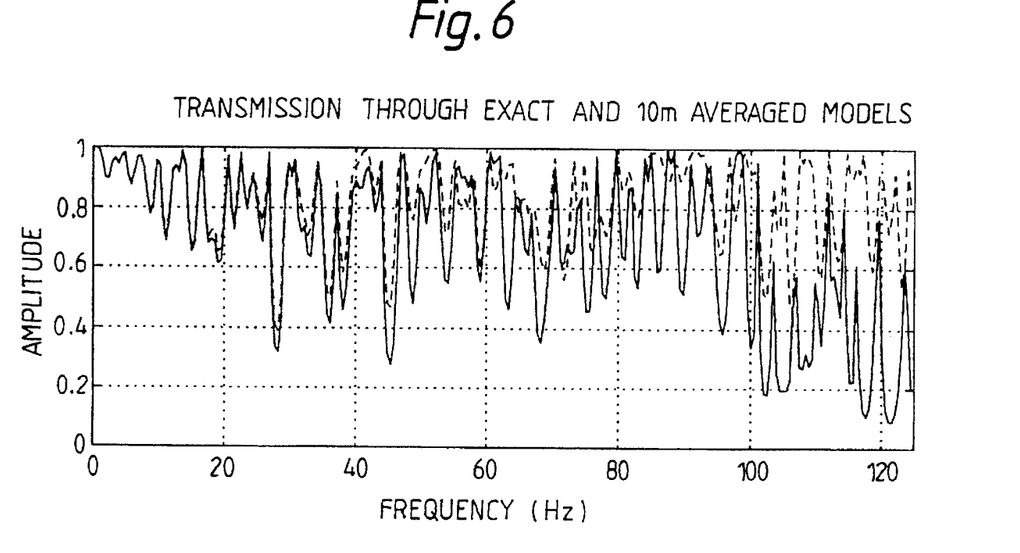
FIG. 6 shows the amplitude spectrum of a P-wave transmitted through the fine layer model (solid line) of FIG. 1, and through the 10 meter ELM model (dashed line) of FIG. 3.

FIG. 6 shows the amplitude spectra for transmission through the fine layer model (solid line) compared to the 10 meter averaged ELM model (dashed line). The errors between the exact model and the 10 meter ELM model, shown in FIG. 7, is far greater than the error shown in FIG. 5 at all frequencies.

Figure 7:
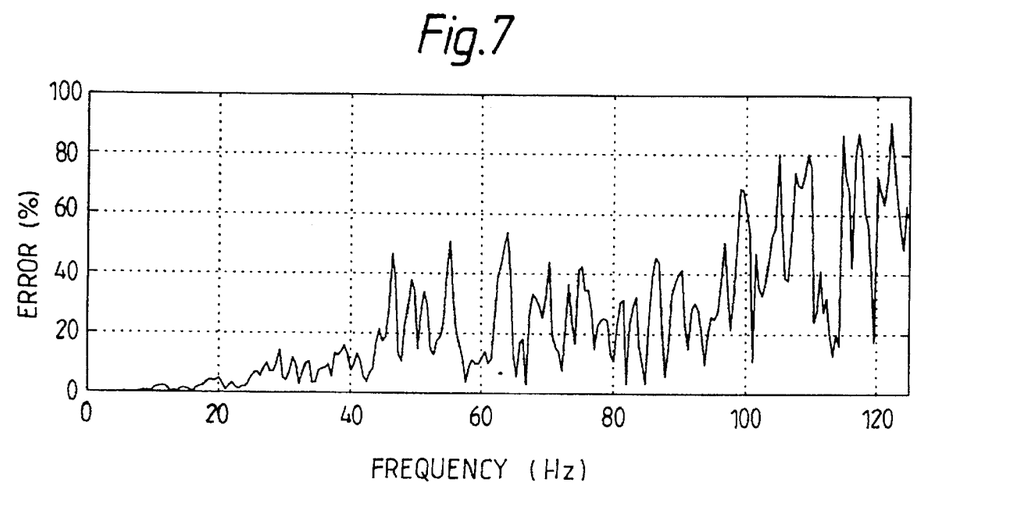
FIG. 7 shows the percent error between the two curves of FIG. 6, plotted against frequency.

FIG. 7 shows the relative amplitude error in percent between the exact response and the response from the 10 meter ELM model. As can be seen, the error is as high as 50% for certain frequencies within the seismic band, compared to less than 10% for the 3 meter ELM model. The large errors produced by these amplitude spectra using simulated sonic and density data demonstrate that using an ELM model having layers far greater than one tenth of the seismic wavelength produces clearly unacceptable results.

Figure 8:
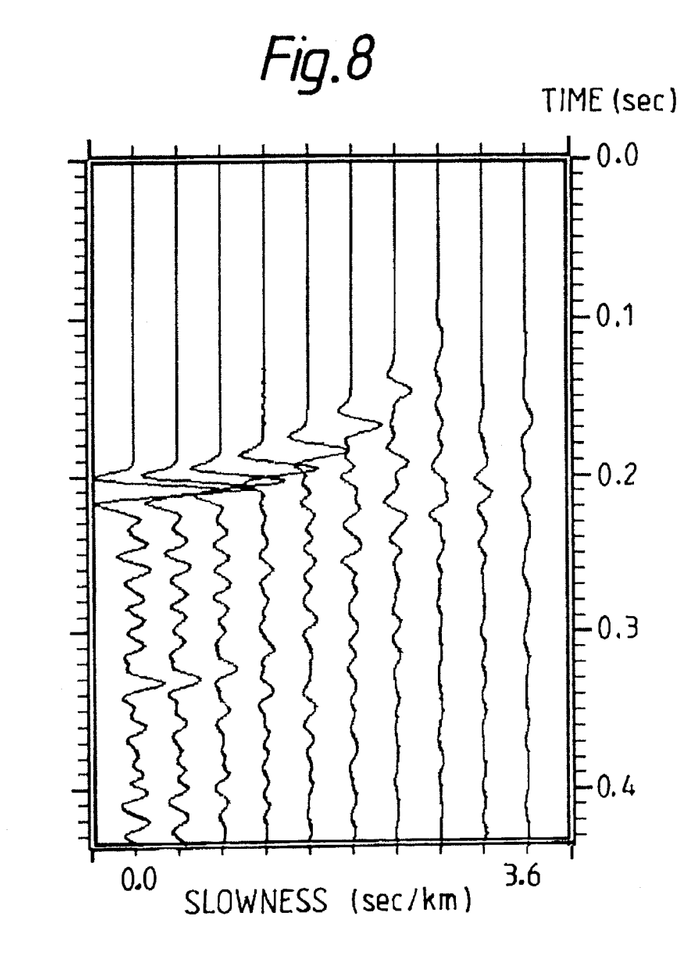
FIGS. 8 and 9 show synthetic seismograms in τ-p domain for a P-wave source at 100 m depth, and a receiver measuring the vertical component (in FIG. 8) and horizontal component (in FIG. 9) of particle velocity at 700 m depth, with the signals from the fine layer model and the 3 meter ELM model of FIG. 2 superimposed.
Figure 9:
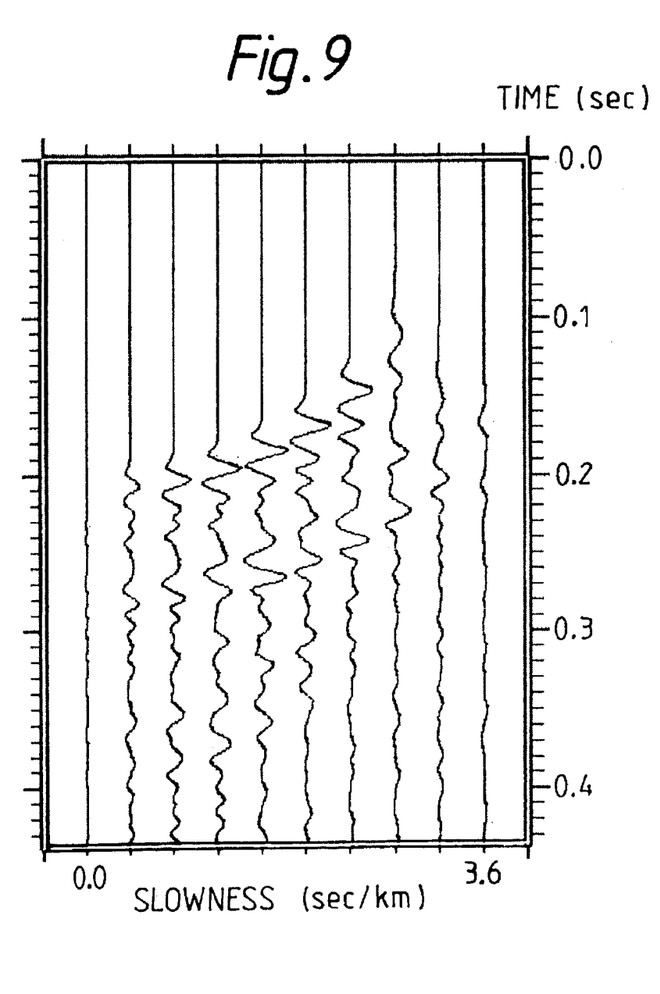

FIGS. 8 and 9 show the synthetic seismograms in τ-p domain for P-wave sources with a 50 Hz Ricker wavelet shape located at 100 m depth, and with receivers measuring vertical (FIG. 8) and horizontal (FIG. 9) components of particle velocity located at 700 m depth in the fine layer and ELM models. The fine layer model signal is superimposed on the 3 meter ELM model signal in FIGS. 8 and 9: the two signals track each other almost exactly, and cannot be distinguished. This demonstrates that the equivalent medium theory, used as described herein above, preserves not only travel times, but also amplitudes of the propagated seismic waves. Consequently, it is possible to use an ELM model of sufficiently thin layer thicknesses to represent the fine layer model, to reduce substantially the computing time, while preserving all key seismic parameters during processing. Using an ELM layer thickness of 3 meters, equivalent to 5% of the dominant seismic wavelength (60 m) in this example, or about one tenth of the smallest significant wavelength, gave excellent agreement with the fine layer model data.

Figure 10:
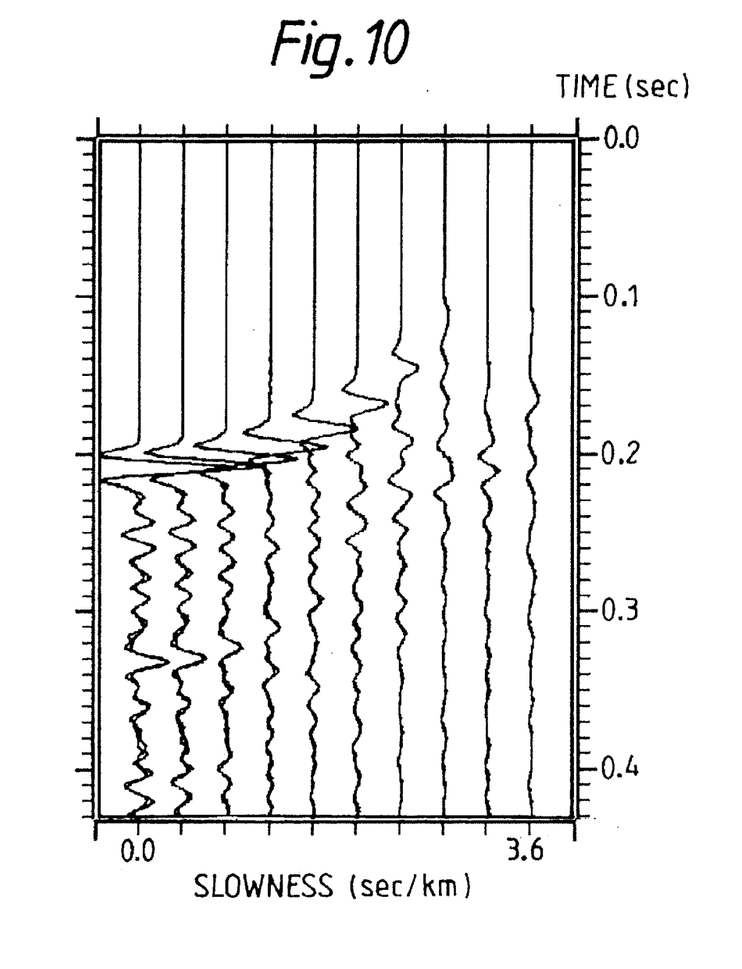
FIGS. 10 and 11 show synthetic seismograms in τ-p domain for a P-wave source at 100 m depth, and a receiver measuring the vertical component (in FIG. 10) and horizontal component (in FIG. 11) of particle velocity at 700 m depth, with the signals from the fine layer model and the 10 meter ELM model of FIG. 3 superimposed.
Figure 11:
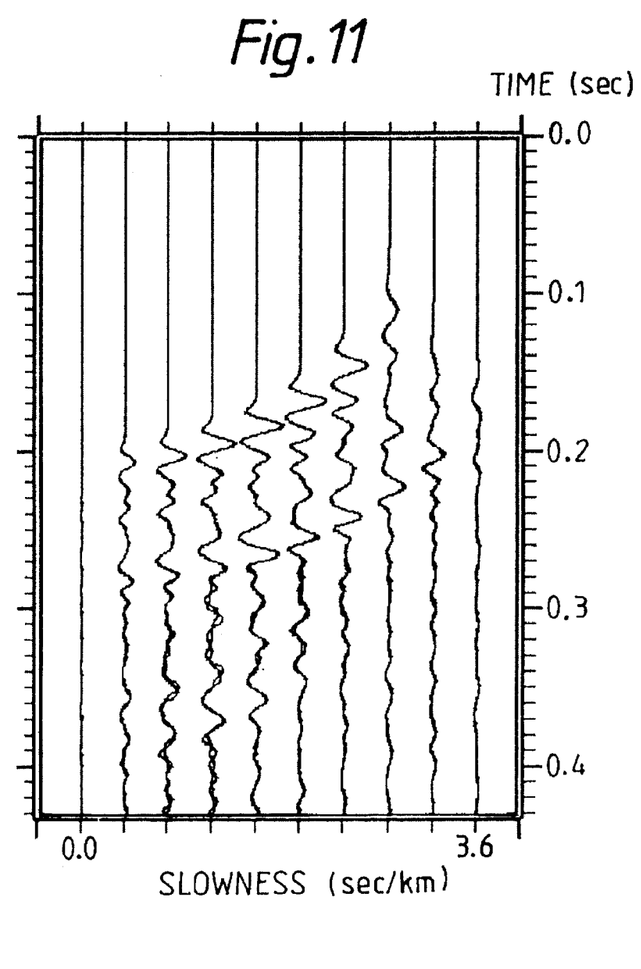
Figure 12:
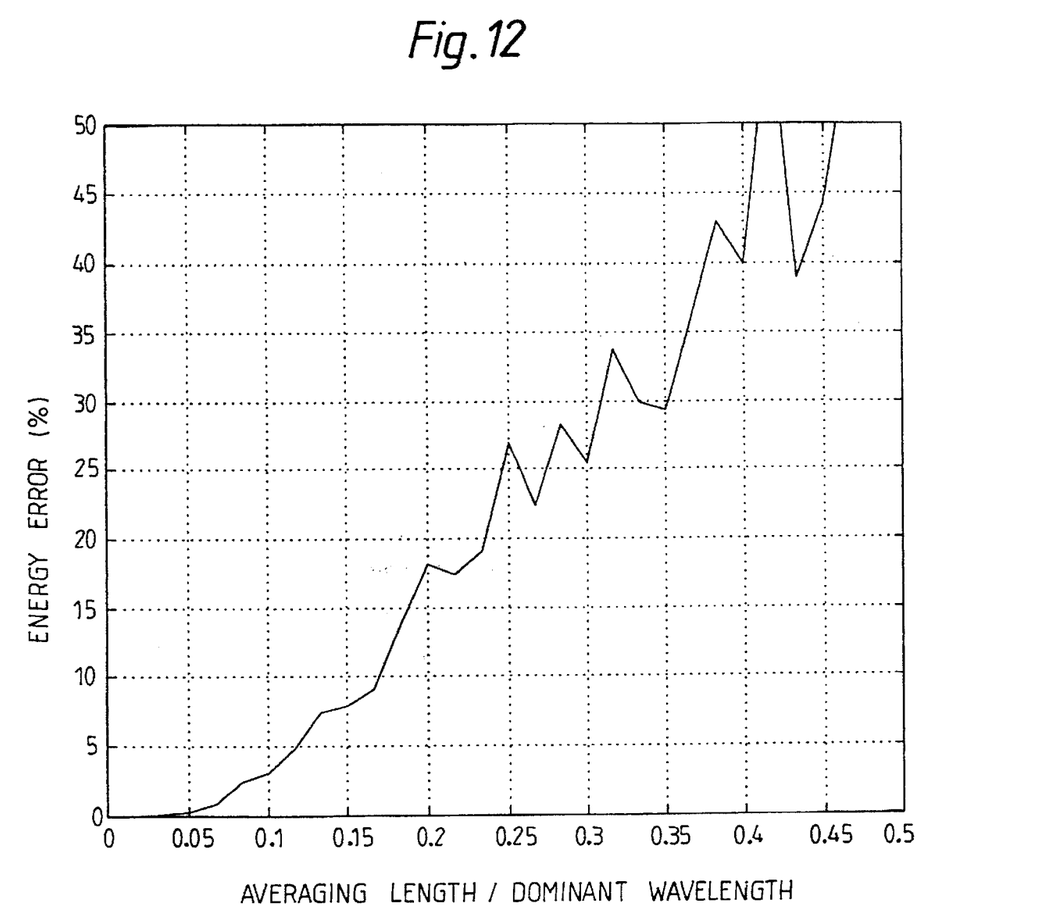
FIG. 12 shows the relationship between energy error and the ratio of the ELM averaging length divided by the dominant seismic wavelength.

In contrast to the above, use of a 10 meter ELM model in this example did produce significant errors. The superimposed signals of the fine layer model with that of the 10 meter ELM model in τ-p domain for vertical and horizontal components of particle velocity are shown in FIG. 10 and FIG. 11, respectively. It is readily seen that the superimposed curves do not track each other well, and significant errors, mainly in amplitude, are introduced. An error is also introduced in the travel time, although this is not as readily apparent from the figures. The equivalent layered medium thickness of 10 meters constituted one-sixth of the dominant seismic wavelength of 50 meters in this example, and was excessively high.

Referring again to FIGS. 8 and 9, comparisons of seismic responses from the fine layer model with that of the 3 meter ELM model show excellent agreement for all incidence angles (in units of slowness), and demonstrate, unexpectedly, that the equivalent medium theory preserves both travel times and amplitudes at all incidence angles. For modelling programmes based on the reflectivity method, the overall computation time depends linearly on the total number of layers in the model, which in this example was reduced by a factor of 30 by using the 3 meter ELM model. Thus, for seismic processing methods incorporating amplitude versus offset techniques, it will be possible and desirable to use an ELM model pursuant to the equivalent medium theory without loss of validity of the results. The benefits of substantially reduced computing time as well as the convenience of manipulation of these methods will result.

FIG. 11 shows, for vertically propagating plane waves in the fine layer model, the dependence of error as a function of increasing averaging length of the ELM model. The energy error E is defined to be $$\Delta E = \sum_{i=1}^{n} (x(i) - x_o(i))^2$$

$$E_o = \Sigma x_o^2(i)$$

$$E = \frac{\Delta E}{E_o} \cdot 100$$

where
X=the ELM signal
Xo=the exact signal of the fine layer model
n=sample numbers of exact signal Energy error E is plotted as a function of averaging length L divided by the dominant seismic wavelength λ, which in this example is 60 meters.

It is seen that above 0.1 L/λ the energy error rises rapidly. For L on the order of one tenth the seismic wavelength, i.e. in the approximate range of 0-0.2 L/λ, the energy error remains under 10%. It is preferable to maintain accuracy substantially better than this, and it is therefore preferable in the present method to stay under approximately 10 percent of the dominant wavelength, where in the given example the error lies under about 2%.

In the example of the 3 meter ELM model shown in FIG. 2, the averaging length used was only 5% of the dominant wavelength, and resulted in excellent agreement with the exact model. It is most preferable to set the averaging length of the ELM model in the approximate range of 5-10% of the dominant seismic wavelength.

The particular energy error function used herein is for purposes of illustration only, and may be replaced by various other ways of analysing error in seismic processing techniques. Similarly, the particular formulations given, pursuant to the equivalent medium theory, are preferred forms of the invention, and are not intended to limit the scope and uses of the invention.

Although the invention has been described with respect to specific embodiments thereof, it will be understood that various modifications and variations may be made without departing from the inventive concepts disclosed. All such modifications and variations, therefore, are intended to be included within the spirit and scope of the appended claims.

What is claimed is:

1. A method of making a synthetic seismogram from input data relating to properties of earth formations sampled at n vertically spaced sampling points, comprising:

defining n substantially horizontally extending fine layers corresponding to the n sampling points, where the properties of the formation of each of the n fine layers are defined as the properties of the formation at the corresponding sampling point;

defining a seismic signal having a predetermined dominant wavelength;

constructing an equivalent model by defining m equivalent horizontally extending layers, where m is substantially smaller than n and the vertical thickness of the thickest of the equivalent layers is no greater than on the order of one-tenth the dominant wavelength, and generating equivalent formation properties for each equivalent layer by combining the sampled formation properties of the fine layers within the respective equivalent layer; and deriving from the equivalent model and the seismic signal a synthetic seismogram.

2. The method of claim 1, further comprising selecting the vertical thickness of the equivalent layers to be approximately one-tenth the dominant wavelength of the seismic signal.

3. The method of claim 1, wherein the equivalent layer formation properties are generated by averaging the sampled formation properties of the fine layers within the respective equivalent layer in accordance with the equivalent medium theory.

4. The method of claim 1 wherein the m fine layers are acoustically isotropic or transversely isotropic, and the equivalent n layers are characterized as transversely isotropic layers.

5. The method of claim 1 further characterized in that the input acoustic data comprises borehole acoustic log data.

6. The method of claim 5 further characterized in that the input acoustic data includes borehole nuclear log data.

7. The method of claim 1 wherein the thicknesses of all equivalent layers within a selected earth section are the same.

8. The method of claim 1 wherein the step of deriving a synthetic seismogram comprises deriving the amplitude of seismic signals propagating through the equivalent model.

9. The method of claim 8 wherein the step of deriving a synthetic seismogram comprises deriving the amplitude versus offset of seismic signals propagating through the equivalent model.

10. In a seismic processing method wherein finely sampled data are obtained representing the characteristics of fine layers of earth formations, a method comprising:

defining a fine layer model wherein each layer corresponds to each of the finely sampled data;

defining a seismic signal having a predetermined dominant wavelength;

constructing an equivalent layered medium representation of the fine layer model, wherein the equivalent layer thicknesses are selected to be no greater than on the order of one-tenth the predetermined dominant wavelength; and performing an operation on the equivalent representation to generate a seismic output related to the finely sampled characteristics of the earth formations.

11. The method of claim 10, wherein the equivalent layer formation properties are generated by averaging the sampled formation properties of the fine layers within the respective equivalent layer in accordance with the equivalent medium theory.

12. The method of claim 11, further comprising selecting the vertical thickness of the equivalent layers to be between approximately one-twentieth and one-tenth the dominant wavelength of the seismic signal.

13. The method of claim 10 further comprising deriving the amplitudes of seismic signals propagating through the equivalent model.

14. A synthetic seismogram produced according to the method as defined in claim 1.

15. A synthetic seismogram produced according to the method as defined in claim 2.

16. A synthetic seismogram produced according to the method as defined in claim 4.

17. A synthetic seismogram produced according to the method as defined in claim 5.

18. A synthetic seismogram produced according to the method as defined in claim 7.

19. A synthetic seismogram produced according to the method as defined in claim 8.

\* \* \* \* \*